United States Patent [19]

Tanahashi

[11] Patent Number: 5,519,511
[45] Date of Patent: May 21, 1996

[54] SCANNER DEVICE AND GUIDE THEREFOR

[75] Inventor: Makoto Tanahashi, Kanagawa, Japan

[73] Assignee: Sony Corporation, Tokyo, Japan

[21] Appl. No.: 503,468

[22] Filed: Jul. 18, 1995

Related U.S. Application Data

[63] Continuation of Ser. No. 246,411, May 20, 1994.

[30] Foreign Application Priority Data

May 31, 1993 [JP] Japan .................................. 5-149907

[51] Int. Cl.⁶ .......................... H04N 1/024; H04N 1/04; G06K 7/10
[52] U.S. Cl. .......................... 358/473; 358/497; 235/472
[58] Field of Search .................................. 358/473, 497; 235/472

[56] References Cited

U.S. PATENT DOCUMENTS

| | | | |
|---|---|---|---|
| 4,684,998 | 8/1987 | Tanioka et al. | 358/473 |
| 4,758,732 | 7/1988 | Kyriakides | 250/566 |
| 4,797,544 | 1/1989 | Montgomery et al. | 358/473 |
| 4,831,459 | 5/1989 | Kimura | 358/473 |
| 4,996,775 | 3/1991 | Sass et al. | 358/473 |
| 5,239,759 | 8/1993 | Dudek | 358/473 |
| 5,295,003 | 3/1994 | Lee | 358/473 |

Primary Examiner—Edward L. Coles, Sr.
Assistant Examiner—Kimberly A. Williams
Attorney, Agent, or Firm—Ronald P. Kananen

[57] ABSTRACT

An image information reading device is provided, which includes a scanner for reading image information and a scanner guide for guiding the scanner. The scanner has a light source, a line sensor for receiving beams of light reflected by an object to be read from beams of light emitted by the light source to generate image information as the scanner is moved and the object to be read is scanned in a vertical scanning direction orthogonal to a horizontal scanning direction of the line sensor. The scanner guide is formed with a guide frame portion which abuts the scanner. The guide frame portion has first and second straight portions formed respectively along the horizontal and vertical scanning directions of the scanner in correspondence with the range which can be read by the scanner and comprises a transparent flat plate portion formed between the first and second straight portions. The scanner is manually moved in the vertical scanning direction along the second straight portion on a flat surface portion of the scanner guide to read the image information on the object to be read.

9 Claims, 10 Drawing Sheets

10 SCANNER

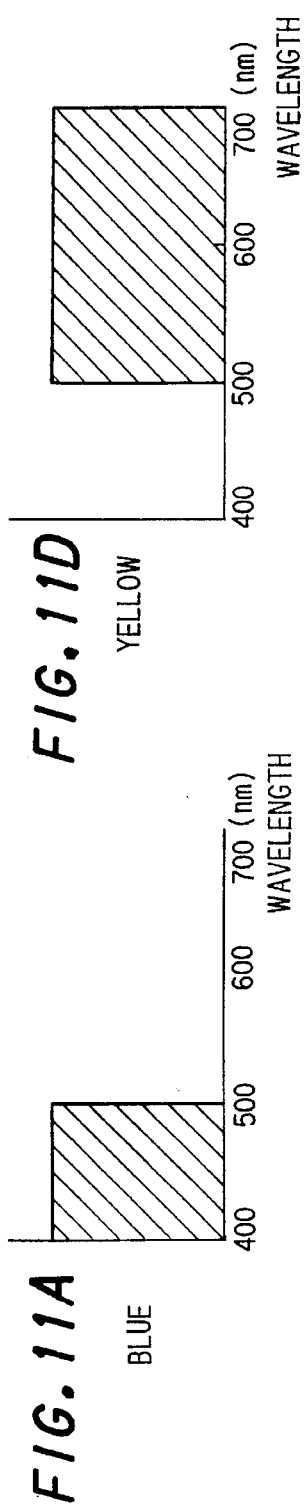
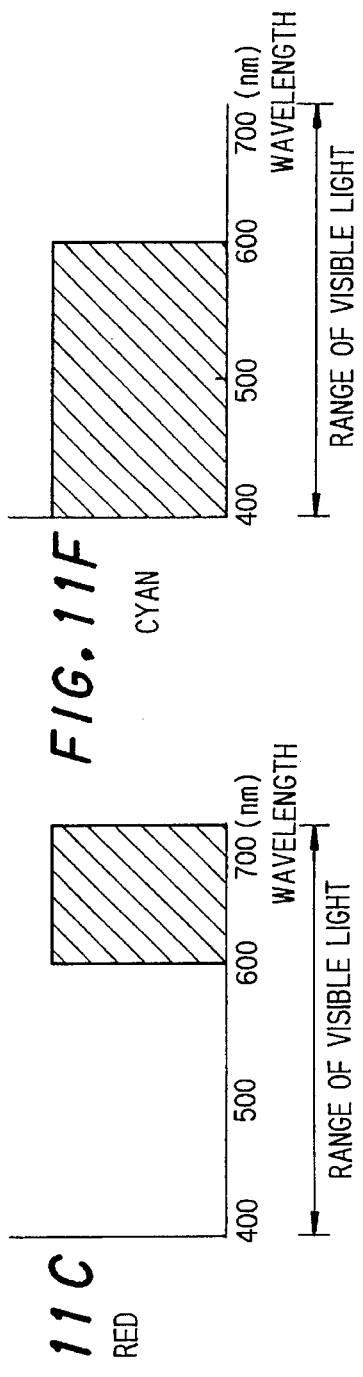
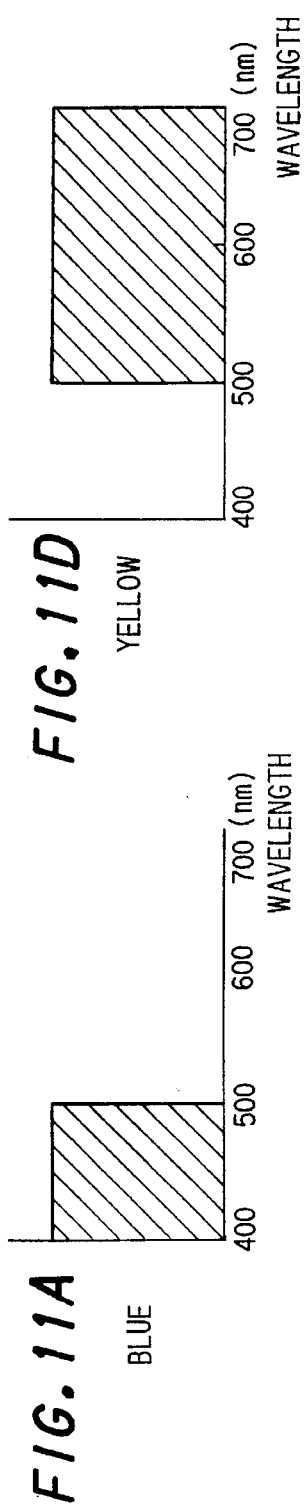
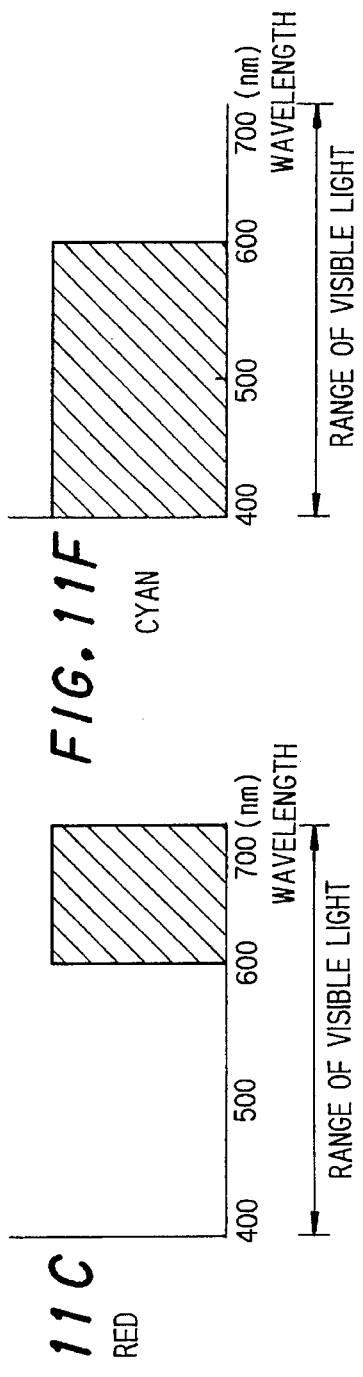
FIG.11A BLUE
FIG.11B GREEN
FIG.11C RED
FIG.11D YELLOW
FIG.11E MAGENTA
FIG.11F CYAN

SCANNER DEVICE AND GUIDE THEREFOR

This application is a continuation of application Ser. No. 08/246,411 filed May 20, 1994.

BACKGROUND OF THE INVENTION

1. Field of the Invention

The present invention relates to an image information reading device for reading image information and, more particularly, to an image reading device for reading image information through manual scanning of a scanner.

2. Description of the Related Art

Scanner devices are known as image reading devices for reading image information. For example, an illustration or the like drawn on a piece of paper is read as image information using a scanner device and is displayed on a monitor or is stored in an image memory.

A conventional handy scanner will now be described with reference to FIG. 1(a) through FIG. 1(d) and FIG. 2.

FIG. 1(a) through FIG. 1(d) are a plane view, side view, bottom view, and front view, respectively, of the handy scanner. The numeral 2 designates a window portion through which a user can check a picture to be read, and 3 designates an image reading portion. A light emitting portion is disposed in the image reading portion 3, and light from the light emitting portion is directed from the image reading portion 3 to a picture or the like to be read. The light reflected therefrom is read as image information and is digitized, The image data thus read are supplied through a cable C to a predetermined apparatus. The numeral 4 designates a read button which is pushed by a user to perform an image reading operation. As shown in FIG. 1(c), cylindrical rollers 5 and 6 are provided on the bottom of the scanner 1 to allow the scanner to be slide-moved.

When the handy scanner 1 having such a configuration is placed on an image drawn on, for example, a piece of paper, the main body of the handy scanner 1 is manually supported in this state with the rollers 5 and 6, and is manually linearly moved. For example, the handy scanner 1 is placed on a piece of paper P as shown in FIG. 2, and is manually caused to scan in the direction of the arrow A from the position indicated by the dashed line to the position indicated by the solid line with the read button 4 held down. Then, the image of an illustration or the like drawn on the piece of paper P at the portion facing the image reading portion 3 on the bottom is read during this sliding motion.

As shown in FIG. 2, the direction of one side in which the handy scanner 1 reads is referred to as a horizontal scanning direction and the direction which is orthogonal to the horizontal scanning direction and in which reading is performed by sliding the handy scanner 1 is referred to as vertical scanning direction.

Such a handy scanner 1 is configured so that it can be linearly moved with the three rollers 5, 5 and 6. However, if the image to be read such as a picture is drawn on an object which is slippery for the rollers 5, 5 and 6 such as stone or glass which is somewhat humid, a slip of the rollers 5, 5 and 6 makes it difficult to linearly slide the handy scanner 1 in the vertical scanning direction. This has made it difficult to read image information of interest.

When an image drawn on a soft object such as a cloth e.g., a pattern on a tie or handkerchief is read, it is very difficult to move the handy scanner 1 in the vertical scanning direction to read the image of interest because the soft cloth may wrinkle preventing the rollers 5, 5 and 6 from smoothly rotating. This has resulted in a problem that a user must perform a troublesome operation of linearly sliding the handy scanner 1 in the vertical scanning direction while stretching the cloth or the like to hold it taut.

In addition, it is difficult for a user to know the dimensions of an image which can be read by the handy scanner 1 and, consequently, to know in advance in what size and how an image will be read.

Specifically, one side of an image to be read, i.e. the horizontal scanning direction can be identified by means such as a mark provided on the window portion of the handy scanner 1, but the other side, i.e. the vertical scanning direction can not be recognized accurately. In other words, one can not tell up to which position on a picture will be read as image data when the handy scanner 1 is slid. In order to exactly know the area which will be read, the area must be confirm by measuring the length thereof on the picture to be read.

Thus, it is not easy for a user to know in advance in what size and how an image will be read. Therefore, in most cases, an image is read by moving the handy scanner 1 on the image at a rough estimate. The image information which has been read is checked on a monitor or the like and the reading of the image using the hand scanner 1 must be repeated many times until the image information thus read agrees with the estimate the operator has. This has made the reading operation very complicated.

SUMMARY OF THE INVENTION

It is, therefore, an object of the present invention to provide an image information reading device to resolve the above-mentioned problem.

According to the present invention, there is provided an image information reading device including a scanner and a scanner guide. The scanner reads image information. The scanner guide is formed with a guide frame portion which abuts the scanner. The guide frame portion is formed along at least two sides which constitute the horizontal and vertical scanning directions of the scanner in correspondence to the range which can be read by the scanner.

According to the present invention, there is provided an image reading device including a scanner for reading image information and a scanner guide. The scanner has a light source and a line sensor for receiving the beams of light reflected by an object to be read having image information from among beams of light emitted by the light source, and is scanned in a vertical scanning direction which is orthogonal to the horizontal scanning direction of the line sensor. The scanner guide is formed with a guide frame portion which abuts the scanner. The guide frame portion has first and second straight portions formed along the horizontal and vertical directions, respectively, of the scanner in correspondence with the range which can be read by the scanner. The scanner is manually moved in the vertical scanning direction along the second straight portion on a flat surface portion of the scanner guide to read the image information of the object to be read.

According to the present invention, when the scanner is manually scanned in the vertical scanning direction to read image information, the scanner is guided by the scanner guide. This allows the image information to be easily and properly read without being read in an oblique direction or along a skewed or staggering path.

BRIEF DESCRIPTION OF THE DRAWINGS

The present invention will be more readily understood with reference to the accompanying drawings.

FIG. 1(a) is a plan view of the scanner. FIG. 1(b) is a side view of the scanner. FIG. 1(c) is a bottom view of the scanner. FIG. 1(d) is a front view of the scanner.

FIG. 4(a) is a front view of the scanner guide. FIG. 4(b) is a side view of the scanner guide.

FIG. 5(a) is a plan view of the scanner. FIG. 5(b) is a side view showing the front of the scanner. FIG. 5(c) is a bottom view of the scanner. FIG. 5(d) is a side view showing the front of the scanner.

FIG. 7(a) shows an example of a piece of paper having image information thereon used to describe a reading operation performed by a scanner device. FIG. 7(b) is a perspective view showing a state wherein a scanner guide is placed on the piece of paper shown in FIG. 7(a).

FIG. 11(a) through FIG. 11(f) illustrate color spectra. FIG. 11(a) shows a color spectrum of blue. FIG. 11(b) shows a color spectrum of green. FIG. 11(c) shows a color spectrum of red. FIG. 11(d) shows a color spectrum of yellow. FIG. 11(e) shows a color spectrum of magenta. FIG. 11(f) shows a color spectrum of cyan.

DESCRIPTION OF THE INVENTION

An embodiment of a scanner device as an image reading device of the present invention will now be described with reference to FIG. 3 through FIG. 11.

Figure 1C:
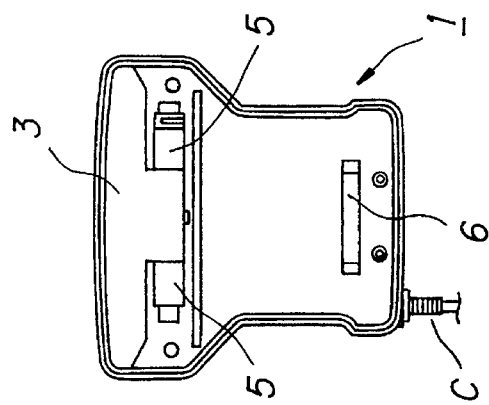
FIG. 1(a) through FIG. 1(d) show the configuration of a conventional scanner.
Figure 1B:
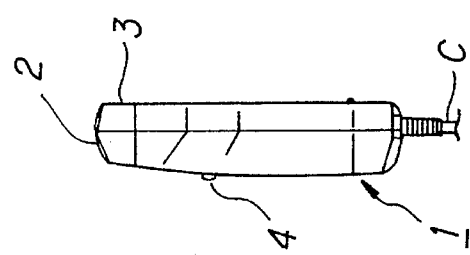
Figure 1D:
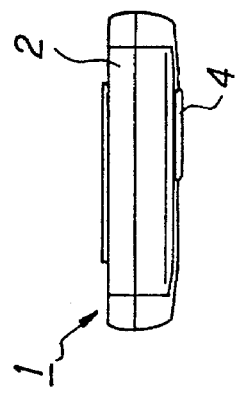
Figure 1A:
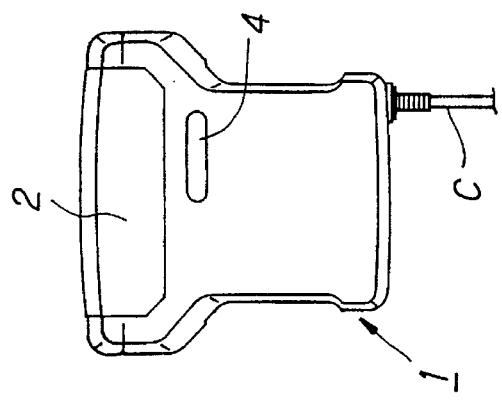
Figure 2:
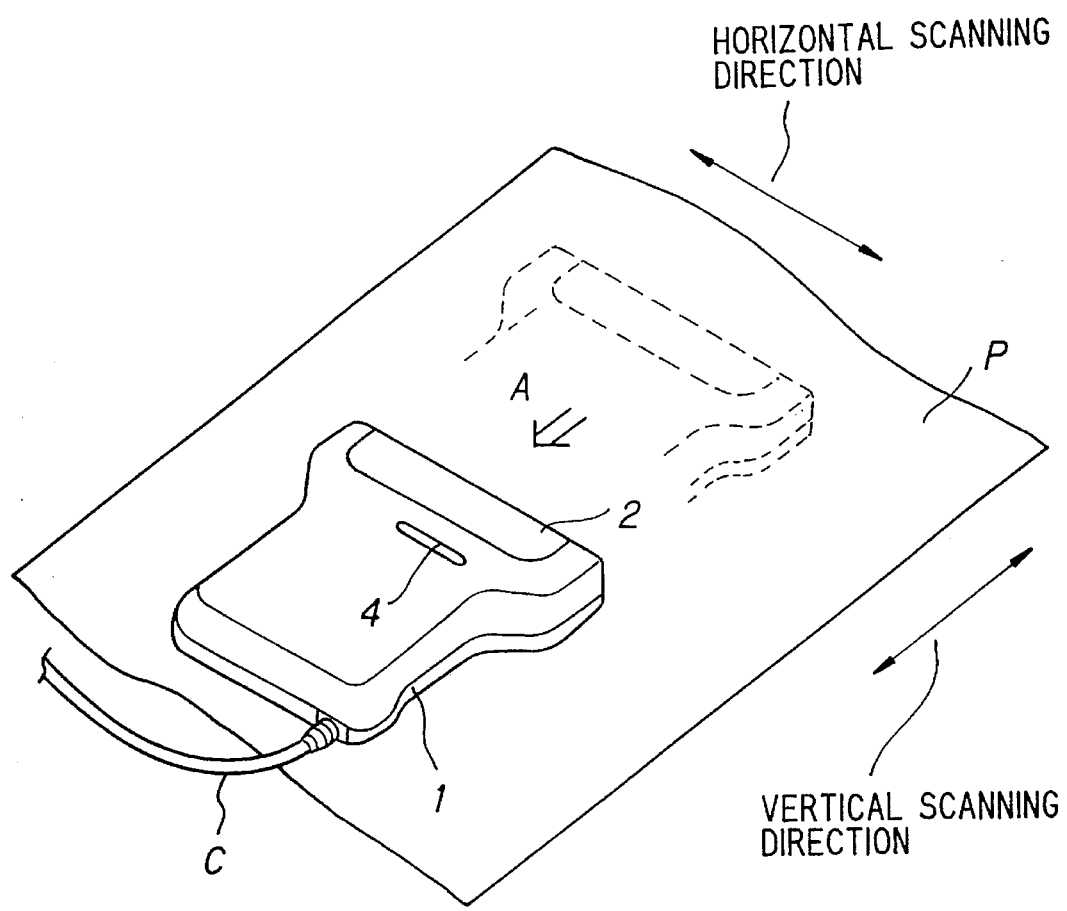
FIG. 2 illustrates an image reading operation performed by the scanner.
Figure 3:
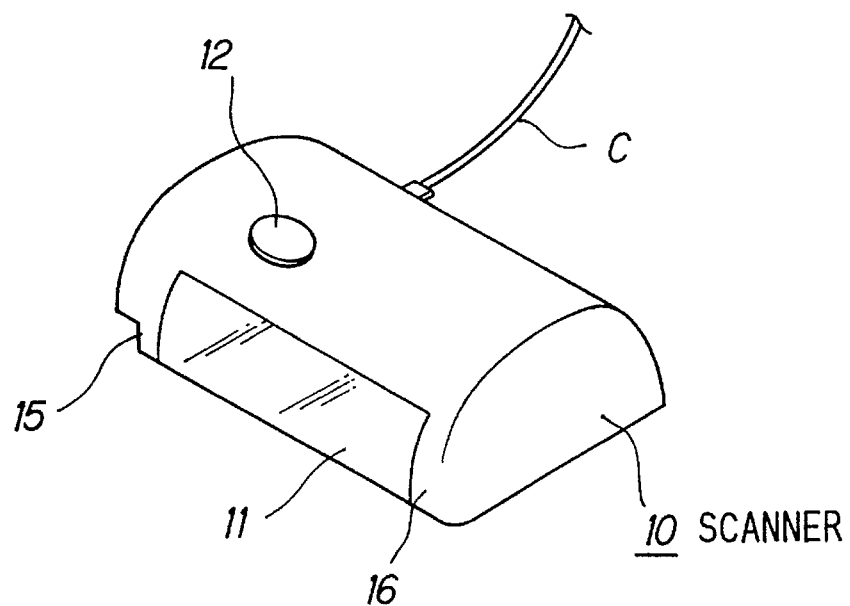
FIG. 3 is a perspective view showing the configuration of a scanner device of an embodiment of the present invention.
Figure 3:
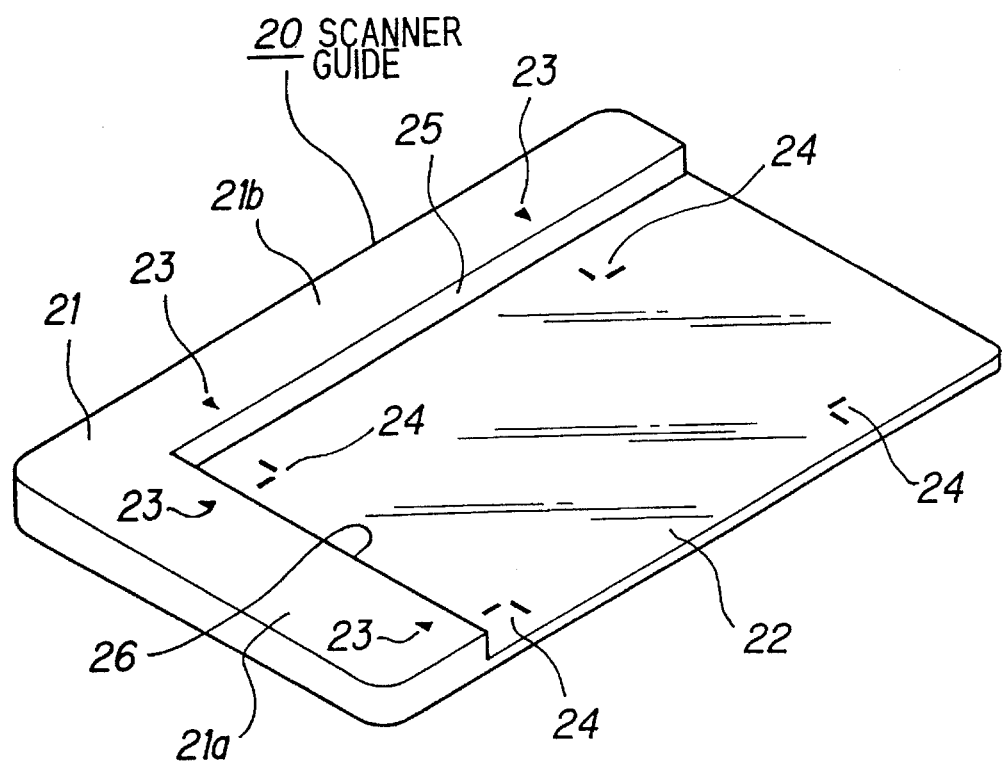
Figure 4A:
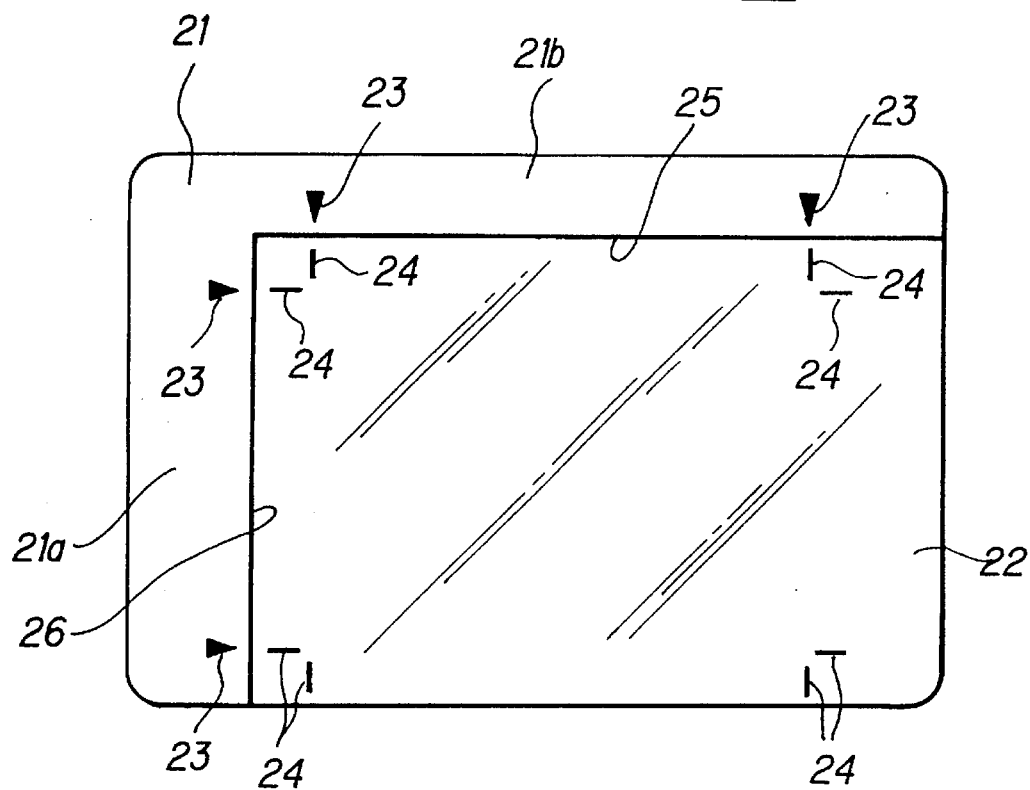
FIG. 4(a) and FIG. 4(b) show the configuration of a scanner guide of an embodiment of the present invention.
Figure 4B:
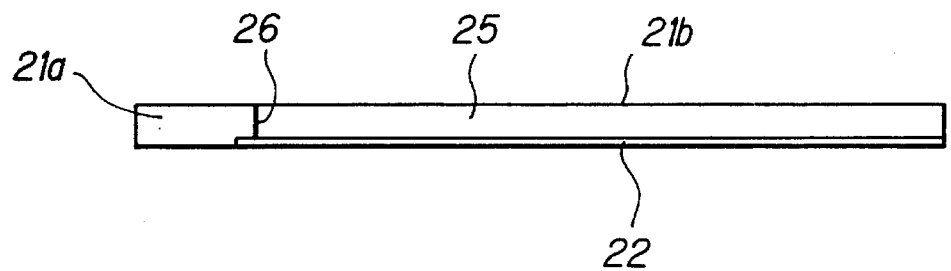

First, the configuration of the scanner device will now be described with reference to FIG. 3, FIG. 4(a), FIG. 4(b) and FIG. 5(a) through FIG. 5(d). FIG. 3 shows perspective views of a scanner 10 and a scanner guide 20 constituting he scanner device of the present embodiment. FIG. 4(a) and FIG. 4(b) are a plane view and a side view of the scanner guide 20, respectively. FIG. 5(a), FIG. 5(b), FIG. 5(c) and FIG. 5(d) are a plan view, a front view, a bottom view and a side view of the scanner 10, respectively.

Figure 5A:
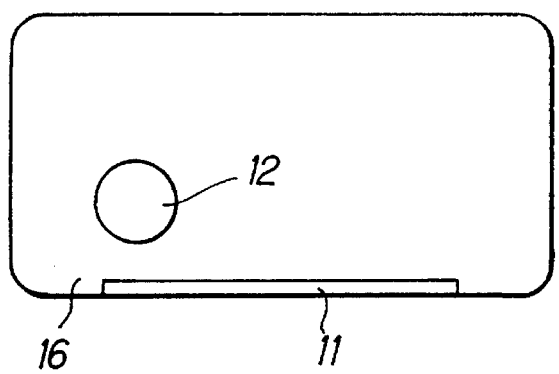
FIG. 5(a) through FIG. 5(d) show configuration of a scanner of an embodiment of the present invention.
Figure 5D:
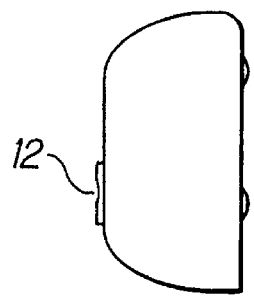
Figure 5B:
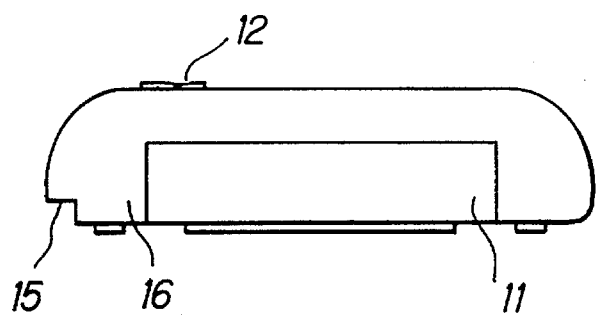
Figure 5C:
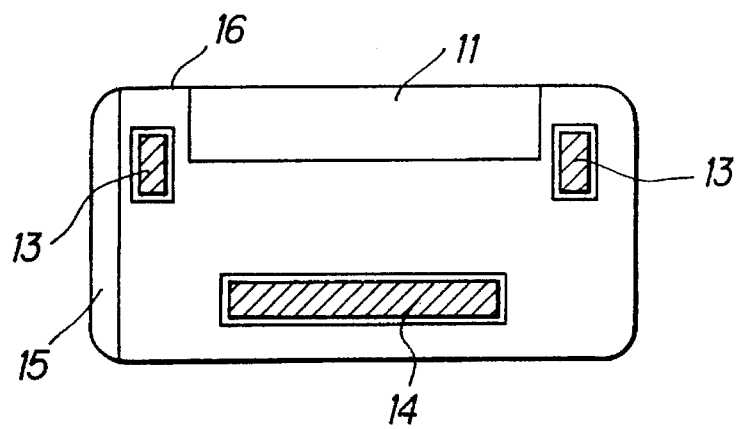

As shown in FIG. 3, FIG. 5(b) and FIG. 5(d), the scanner 10 is in a substantially cylindrical form. The numeral 11 designates an image reading window which is formed to be continuous on the bottom and front surfaces as shown in FIG. 5(b) and FIG. 5(c). Therefore, when an image is read at the bottom surface, the user can check the image being read by looking down at it through the image reading window 11.

The numeral 12 designates a read button which is held down by a user to perform a reading operation while image information is being read.

The numerals 13 and 14 designate rollers for supporting the scanner 10 and for linearly moving the scanner 10 in the vertical scanning direction.

The numerals 15 and 16 designate a slide groove and a stopper abutting portion, respectively, which will be described later.

Figure 6:
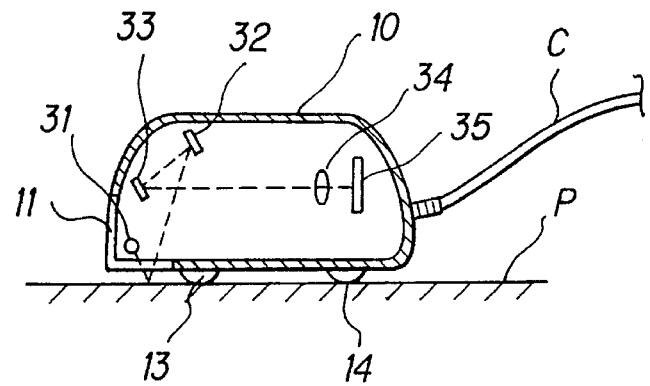
FIG. 6 is a sectional view schematically illustrating an image reading mechanism of a scanner.

An image reading mechanism in the scanner 10 has the configuration as schematically shown in FIG. 6. A light emitting portion 31 constituted by, for example, an LED is disposed in the image reading window 11, and the light from the light emitting portion 31 is directed through the image reading window 11 at the bottom to a piece of paper P on which image reading is to be performed and, more particularly, to an image drawn on the piece of paper P. The light reflected therefrom is taken in through the image reading window 11, reflected by mirrors 32 and 33, and directed through a lens 34 to a light-receiving element 35 constituted by a CCD line sensor.

Image data obtained by the light-receiving element 35 are supplied to a signal processing circuit (not shown) to be converted into digital data which are output through a cable C to a predetermined apparatus.

The scanner guide 20 is in the form of a substantially flat rectangle as shown in FIG. 3, FIG. 4(a) and FIG. 4(b).

The numeral 21 designates a guide frame which is disposed in a position corresponding to two sides of the rectangle. The numeral 21a designates a guide frame provided in parallel with the horizontal scanning direction of the scanner 10, and 21b designates a guide frame provided in parallel with the vertical scanning direction of the scanner 10. The guide frame 21a and the guide frame 21b are formed so that they connect with each other to be substantially L-shaped as shown in FIG. 4(a).

The numeral 22 designates a transparent plate which is in the form of a flat plate and is mounted to the bottom of the guide frame 21. As shown in FIG. 4(b), the transparent plate 22 is disposed between the guide frames 21a and 21b so that it is flush with the bottom surfaces of the guide frames 21a and 21b.

Markers 23 and 24 are provided on the guide frame 21 and the transparent plate 22, respectively. The marker 23 serves as a mark indicating the range of the image which can be read as image data by the scanner 10. The range of the image which can be read as image data is the range of the image as the quantity of data which can be stored by an image memory of an apparatus fetching the image data through the scanner 10 or the scanner itself, i.e., the quantity of data as one image.

The inner edge of the guide frame 21b constitutes a slide edge 25, and the inner edge 21a of the guide frame 21a constitutes a stopper edge 26. The slide edge 25 abuts the slide groove 15 of the scanner 10, and the stopper edge 26 abuts the stopper abutting portion of the scanner 10.

An image reading operation performed by a scanner device constituted by the scanner 10 and scanner guide 20 as described above will now be described with reference to FIG. 7(a) through FIG. 10.

Figure 7A:
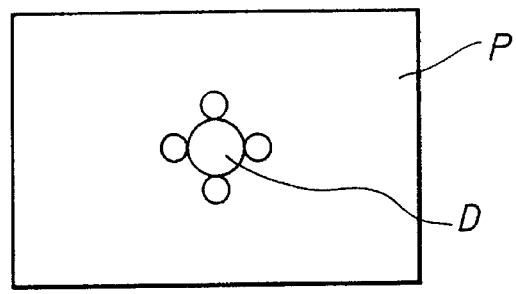
FIG. 7(a) and FIG. 7(b) illustrate a reading operation performed by a scanner device of an embodiment of the present invention.

An example will now be presented, wherein a paper P on which an illustration D as shown in FIG. 7(a) is drawn is prepared and the illustration D is read as image data.

Figure 7B:
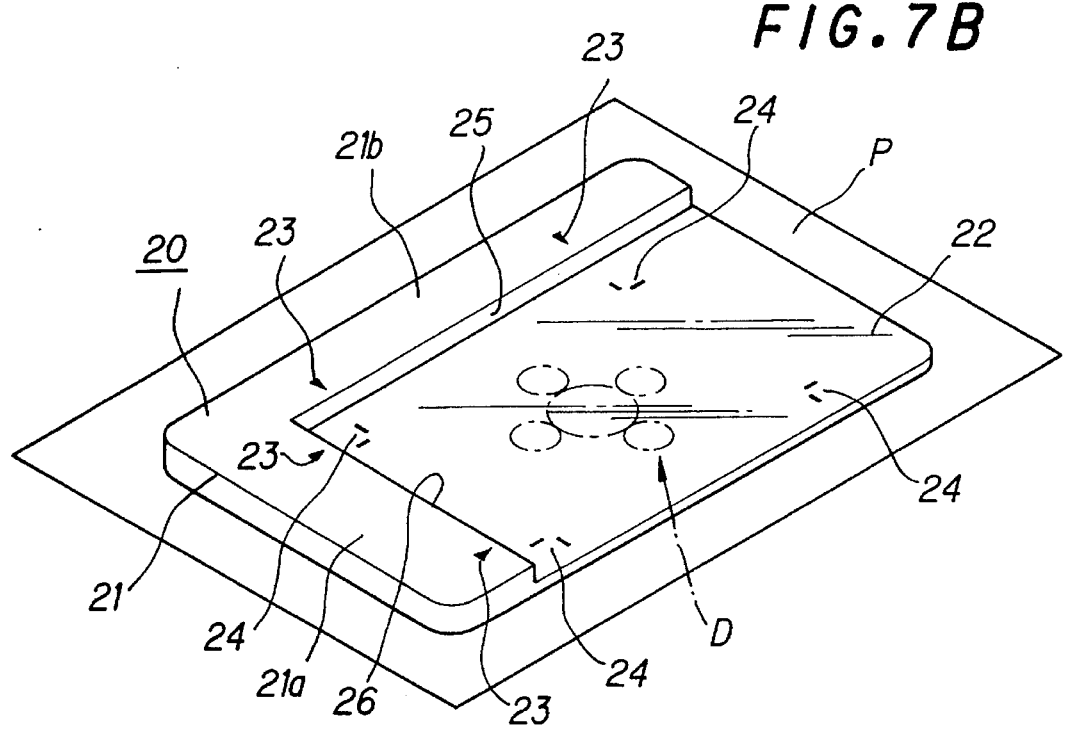

As shown in FIG. 7(b), the scanner guide 20 is placed on the paper P and is positioned so that the illustration D falls within a readable range indicated by the markers 24 provided on the transparent plate 22. Specifically, image information which is actually read by the scanner 10 is the image in the area indicated by the markers 24 in this state. This allows the user to clearly confirm the image to be read prior to the reading operation of the scanner 10. In other words, a desired image can be set in an information reading range through setting of the position in which the scanner guide 20 is placed.

Figure 8:
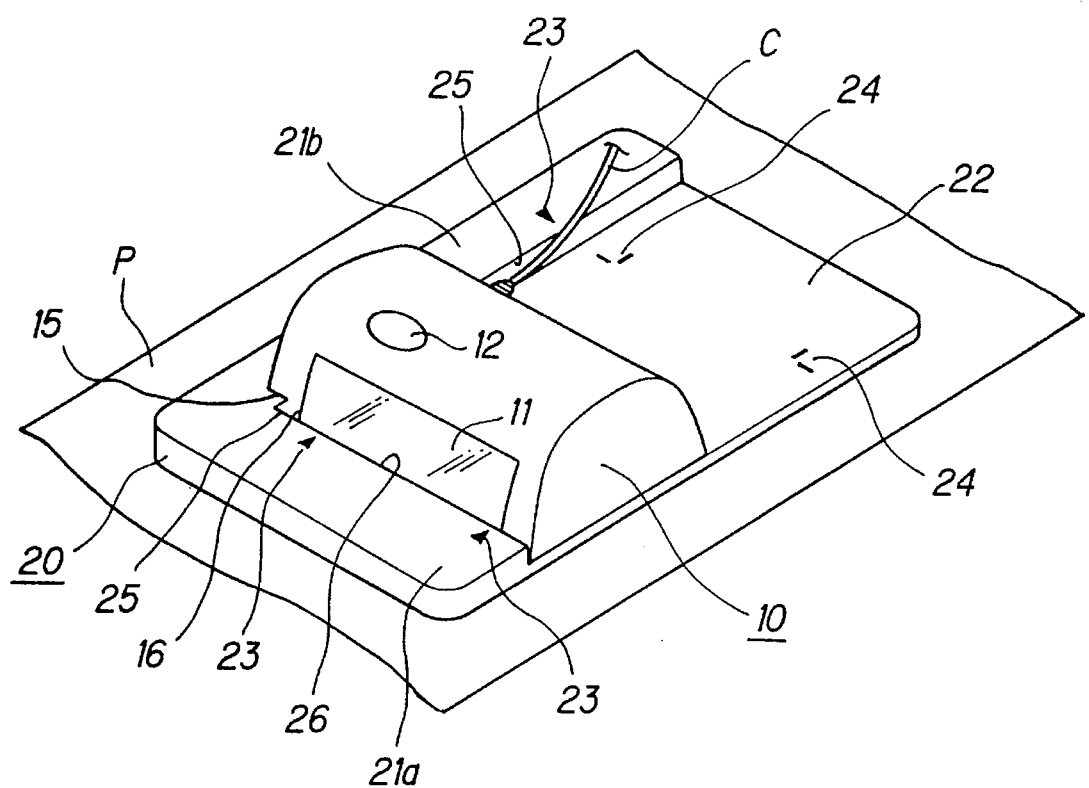
FIG. 8 is a perspective view showing a state wherein a scanner is set on the scanner guide in the state shown in FIG. 7(b).

When the position of the scanner guide 20 is set as shown in FIG. 7(b), and the scanner 10 is set on the scanner guide 20 as shown in FIG. 8; the slide groove 15 of the scanner 10 abuts the slide edge 25 and the stopper edge 16 of the scanner 10 abuts the stopper edge 26. With the scanner 10 thus set on the scanner guide, the guide frame 21 defines a read start position for the scanner 10.

Figure 9:
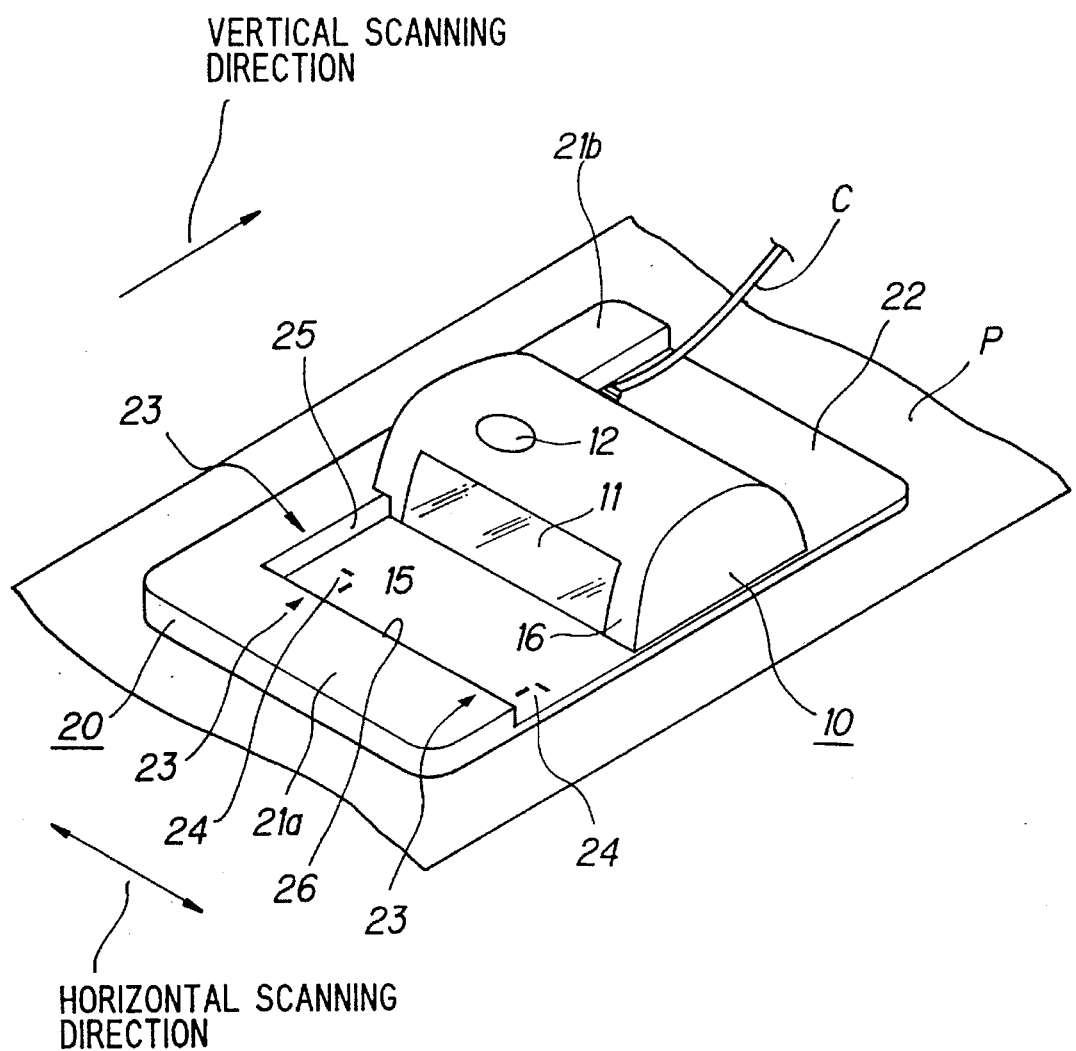
FIG. 9 is a perspective view showing a state wherein the scanner has been moved from the state shown in FIG. 8.
Figure 10:
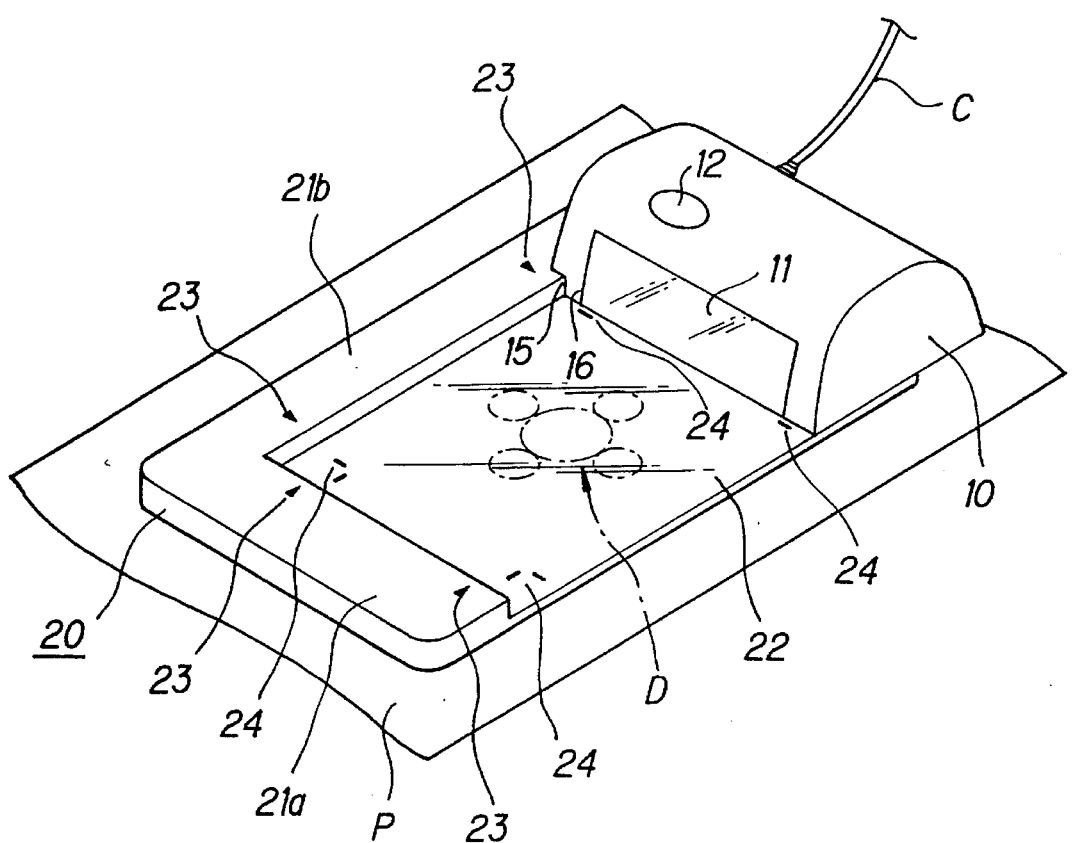
FIG. 10 is a perspective view showing a state wherein the scanner has been moved to an end-of-reading position from the state shown in FIG. 9.

In such a state, the user manually moves the scanner 10 in the vertical scanning direction as shown in FIG. 9 with the read button 12 held down. The scanner is further moved as shown in FIG. 10. An operation to read image information in the horizontal scanning direction is performed by the light-receiving element 35 of the scanner 10 within the range in the vertical scanning direction indicated by the markers 24, the operation being checked by the user through the reading window 11.

When the scanner 10 has been slid to the position shown in FIG. 10, the image reading operation of the scanner 10 is complete. At this point, image data which includes the illustration D on the draft P at the center of a screen has been fetched into an image memory of a predetermined apparatus to which the scanner 10 is connected.

In the embodiment as described above, the scanner guide 20 is first placed on an image to be read, and the scanner 10 is moved on the scanner guide 20 to read the image through the transparent plate 22. Thus, the sliding operation of the scanner 10 can be always preferably performed regardless of the material of the object on which the image is drawn and the like. For example, a pattern, design or the like drawn on glass, stone, cloth or the like can be preferably read. Further, since the transparent plate 22 tightly holds the object on which the image is drawn, image reading will not become troublesome even for an image drawn on a soft material such as cloth or a wet object.

In addition, since an image is read through the transparent plate 22, dust on the piece of paper to be read, if any, will not be brought into direct contact with the scanner 10. This provides a function of protecting the scanner 10.

As previously mentioned, the user can have an idea about how the image will be read when the scanner guide 20 is placed on the image to be read. Therefore, if the position setting is made in conformity with the idea, there will be no need for repeated reading operations using the scanner 10 to obtain the image that agrees with the idea.

When the scanner 10 is slid, the position at which the sliding operation is started is defined by the guide frames 21a and 21b, and the sliding operation is guided by the guide frames 21a and 21b. This allows the sliding operation to be easily and accurately performed. As a result, there is no possibility that the image information is read in an oblique direction or along a skewed path.

Although the guide frame 21 is constituted by two edges in the present embodiment, it may be constituted by three or four edges.

The range in which image can be read may be indicated in various manners other than the use of the above-described markers 23 and 24. For example, the marker may be in the form of a frame indicating the image-readable range. Alternatively, the image-readable range may be made distinguishable by making the transparent plate 22 transparent only at that range, with the portions surrounding it made semitransparent or opaque.

The indication of the image-readable range such as the above-described marker 24 provided on the transparent plate 22, are preferably of a color included within the spectrum of the beam of light emitted by the light emitting portion 31 of the scanner 10 or in a color which can not be detected by the scanner 10.

Such a setting will prevent the markers 24 from being detected as image information even when the scanner 10 passes over the markers 24. Thus, the user can scan the scanner 10 without worrying about the markers 24.

For example, if the light from an LED as the light emitting portion 31 is yellow, the marker 24 is provided in green or yellow. Then, the marker 24 will not absorb the yellowish green light and reflects most of it. Therefore, if the sensitivity of the scanner 10 is properly adjusted, marker 24 can not be distinguished by the scanner 10 from other colors, whitish colors in most cases. In other words, it can not be detected as an image.

This can be explained as follows.

Colors are categorized into self-luminous colors which emit light by themselves and object colors which transmit or reflect light to appear as colors. The marker 24 under discussion is in an object color. Object colors are categorized into transparent colors which appear when light passes through certain objects and reflection colors which appear when light is reflected by the surfaces of certain objects. In the present invention, the color of the marker may be either a transparent or reflection color.

When light passes through a transparent color, it allows spectral components of predetermined colors to pass therethrough and cuts off spectral components of other colors. For example, if a beam of light in white (a beam of light including red, green and blue appears white.) is directed to an object of a green transparent color, spectral components of green pass therethrough while spectral components of red and blue are cut off. As a result, the light transmitted is green.

In the case of reflected light, when light is reflected by the surface of an object, only spectral components of predetermined colors are reflected and spectral components of other colors are absorbed. Therefore, when a beam of light in white is directed to an object of a green reflection color, spectral components of green are reflected while spectral components of red and blue are absorbed. As a result, the reflected light is green.

FIG. 11(a) through FIG. 11(f) show spectra of blue, green, red, yellow, magenta, and cyan, respectively.

As apparent from FIG. 11(d), the spectrum of yellow includes spectral components of green and red. As shown in FIG. 11(e), magenta includes spectral components of blue and red. Cyan includes spectral components of blue and green.

In terms of the actions of transparent and reflection colors as described above, since the yellow spectrum includes spectral components of green and red, green and red are transmitted or reflected but blue is cut off or absorbed.

Such characteristics are utilized in the present embodiment such that if the light output by the light emitting portion 31 is yellowish green, the marker 24 is provided in a transparent or reflection color of green or yellow. If the marker 24 is in a green or yellow transparent color, the scanner 10 can not detect the marker 24 because the yellowish green light passes through the transparent color. If the marker 24 is in a green or yellow reflection color, the yellowish green light is reflected and becomes indistinguishable from the white background of an image, i.e., the marker 24 is determined to be the white background and can not be detected as an image.

Now a user does not need to worry about the marker 24 during operation and there is no possibility that the marker 24 is erroneously detected as an image.

Although the scanner device in the present embodiment is a combination of the scanner 10 and the scanner guide 20, it goes without saying that the scanner 10 may be slid directly on a piece of paper or the like.

While the scanner guide described is constituted by the guide frames and the transparent plate, the scanner guide may be constituted only by the guide frames. In this case, the scanner is slid on a piece of paper or the like in direct contact therewith.

While the present invention has been shown and described with reference to the foregoing operational principles and preferred embodiment, and it will be apparent to those skilled in the art that other changes in form and detail may be made without departing from the spirit and scope of the invention as defined in the following claims.

What is claimed is:

1. An image information reading device, comprising:

a scanner for reading image information; and a scanner guide having a guide frame portion formed thereon, said guide frame portion including at least two adjacent, orthogonal side members extending in directions which respectively correspond to the horizontal and vertical scanning directions of said scanner, said scanner guide including means for defining a range within a plane defined by said at least two side members which can be read by said scanner, one of said side members having means for guiding said scanner is the vertical scanning direction and the other of said side members having means for defining a stop abutment position of said scanner;

wherein said scanner is manually moved in the vertical scanning direction from said stop abutting position along the guide frame of said scanner guide to read image information;

wherein said scanner includes a light emitting portion for emitting light having a spectrum, and wherein a first of said side members comprises a first straight portion extending along the horizontal scanning direction of said scanner, and a second of said side members comprises a second straight portion extending along the vertical scanning direction of said scanner for guiding the movement of said scanner in the vertical direction, and wherein said scanner .guide further comprises a flat plate portion formed between said first and second side members, said flat plate portion being light transmissive at least for light within the spectrum emitted by the light emitting portion of said scanner; and wherein said flat plate portion has a display portion for providing a visual only check on the range of image information read by said scanner.

2. The image information reading device according to claim 1 wherein said scanner includes a light emitting portion and said display portion comprises a color included within the spectrum of light emitted by said light emitting portion.

3. The image information reading device according to claim 1 wherein said scanner includes a light emitting portion and a photo-detector and wherein said display portion comprises a color which can not be detected by said photodetector.

4. An image information reading device for reading image information from an object to be read, comprising:

a scanner including a light source, and a line sensor having a horizontal scanning direction for receiving beams of light reflected by an object to be read from beams of light emitted by said light source to thereby generate image information as said scanner is moved in a vertical scanning direction thereof orthogonal to said horizontal scanning direction;

a scanner guide having a guide frame portion, said guide frame portion comprising first and second straight portions formed respectively along said horizontal and vertical scanning directions and including means for defining the readable range of said scanner and means for defining an abutting start position of said scanner, said guide frame portion further including a transparent flat plate portion formed between said first and second straight portions, for positioning said scanner on said object to be read and on the plate defined by said first and second portions;

wherein said scanner is manually moved from said abutting start position in the vertical scanning direction along the second straight portion of said scanner guide to read image information on said object to be read;

wherein said first and second straight portions have bottom portions and wherein said transparent flat plate portion has a bottom portion which is flush with the bottom portion of said first and second straight portions; and wherein said transparent flat plate portion has a display portion for visually checking the range of the image information being read by said scanner without being readable by the scanner, 5. The image information reading device according to claim 4 wherein said scanner includes a light emitting portion for emitting light having a spectrum and wherein said display portion comprises a color included within the spectrum of light emitted by said light emitting portion.

6. The image information reading device according to claim 4 wherein said scanner includes a light emitting portion and a photo-detector and wherein said display portion comprises a color which can not be detected by said photodetector.

7. The image information reading device according to claim 4 wherein said scanner is formed with an engaging portion for slidably engaging said second straight portion.

8. The image information reading device according to claim 4 wherein said first and second straight portions have bottom portions and wherein said transparent flat plate portion has a bottom portion which is flush with the bottom portion of said first and second straight portions.

9. The image information reading device according to claim 4 wherein said first and second straight portions are connected to form a substantially L-shaped frame.

* * * * *